(12) United States Patent
Lin et al.

(10) Patent No.: US 7,540,975 B2
(45) Date of Patent: Jun. 2, 2009

(54) OPTICALLY COMPENSATED BIREFRINGENCE ALIGNMENT AGENT, LIQUID CRYSTAL DISPLAY UTILIZING THE SAME AND FABRICATION METHOD THEREOF

(75) Inventors: Kun-Yu Lin, Hsinchu (TW); Kai-Neng Yang, Tainan (TW); Ming-Hung Wu, Taipei (TW); Hao-Yu Chang, Jhubei (TW)

(73) Assignee: Au Optronics Corp., Hsinchu (TW)

( * ) Notice: Subject to any disclaimer, the term of this patent is extended or adjusted under 35 U.S.C. 154(b) by 512 days.

(21) Appl. No.: 11/348,569

(22) Filed: Feb. 7, 2006

(65) Prior Publication Data

US 2006/0202162 A1 Sep. 14, 2006

(30) Foreign Application Priority Data

Mar. 10, 2005 (TW) .............................. 94107269 A

(51) Int. Cl.
*C09K 19/00* (2006.01)
*C09K 19/52* (2006.01)
(52) U.S. Cl. .................... 252/299.01; 428/1.1; 428/1.2; 430/20; 430/270.1; 345/176
(58) Field of Classification Search ... 252/299.1–299.7, 252/299.01; 430/20, 270.1; 428/1.1, 1.2; 345/176
See application file for complete search history.

(56) References Cited

U.S. PATENT DOCUMENTS

2003/0231272 A1 12/2003 Nakamura et al.
2006/0279502 A1* 12/2006 Chang ......................... 345/95

FOREIGN PATENT DOCUMENTS

CN 1462898 12/2003
CN 1584710 2/2005

OTHER PUBLICATIONS

CN Office Action mailed Mar. 30, 2007.

* cited by examiner

*Primary Examiner*—Geraldina Visconti
(74) *Attorney, Agent, or Firm*—Thomas, Kayden, Horstemeyer & Risley

(57) ABSTRACT

An optically compensated birefringence liquid crystal alignment agent. The liquid crystal alignment agent includes one or more polymerizable monomers polymerized to form a polymer having liquid crystal alignment memory on an alignment layer by irradiating an energy ray. Liquid crystals are rapidly converted from splay state to bend state along the polymer memory direction so that a liquid crystal display reaches steady state immediately by only applying normal voltage, without application of high voltage. The invention also provides a liquid crystal display including the liquid crystal alignment agent and a method for fabricating the liquid crystal display.

30 Claims, 11 Drawing Sheets
(1 of 11 Drawing Sheet(s) Filed in Color)

OPTICALLY COMPENSATED BIREFRINGENCE ALIGNMENT AGENT, LIQUID CRYSTAL DISPLAY UTILIZING THE SAME AND FABRICATION METHOD THEREOF

BACKGROUND

The present invention relates to a liquid crystal display, and more specifically to an optically compensated birefringence liquid crystal display.

Liquid crystal displays are widely used in various applications due to low power consumption and lightweight for mobile.

Unfortunately, there are some drawbacks, for example, contrast ratio may be deteriorated by the increased viewing angle, thus, extension of viewing angle is limited. Compared to CRT displays, Liquid crystal displays have slower response speed, resulting in image delay. The National Television Standard Committee (NTSC) dictates that a video frequency signal must be shown once within a 16.7 ms period. Currently, response speed between white and black displays is adequate. Response speed for multiple gray levels is slow, however, particularly for regions having a lower effective applied voltage difference. Thus, a liquid crystal display with wide viewing angle and high response speed is desirable.

To solve the problems, an optically compensated birefringence (OCB) liquid crystal display has been developed. FIG. 1 depicts a cross-section of a conventional optically compensated birefringence (OCB) liquid crystal display 10. The liquid crystal display 10 includes an upper substrate 20 having an upper electrode 22 and an upper alignment layer 24 formed thereon in order, a lower substrate 50 having a lower electrode 52 and a lower alignment layer 54 formed thereon in order, and a liquid crystal layer 40 comprising a plurality of liquid crystals 42 installed between the upper and lower substrates. Referring to FIGS. 2a-2c, liquid crystal arrangements of the optically compensated birefringence (OCB) liquid crystal display 10 with various applied voltages are illustrated. The liquid crystal layer 40 comprises a first liquid crystal region A contacting with the upper alignment layer 24, a third liquid crystal region C contacting with the lower alignment layer 54, and a second liquid crystal region B installed therebetween.

Referring to FIG. 2a, the liquid crystals 42 in the first and third liquid crystal regions (A and C) have small included angles with the upper and lower alignment layers (24 and 54), respectively, at the initial state of zero applied voltage, and the liquid crystals 42 in the second liquid crystal region B are almost parallel to the alignment layer. These liquid crystals present a splay state arrangement.

Referring to FIG. 2b, the liquid crystals 42 in the first and third liquid crystal regions (A and C) have small included angles with the upper and lower alignment layers (24 and 54), respectively, with an increased applied voltage from zero to a critical voltage (Vc), and only the central liquid crystal 42 in the second liquid crystal region B is perpendicular to the alignment layer. These liquid crystals present a bend state arrangement, which is a bright state of an optically compensated birefringence (OCB) liquid crystal display.

Referring to FIG. 2C, the liquid crystals 42 in the second liquid crystal region B are almost perpendicular to the alignment layer, with an increased applied voltage from the critical voltage (Vc) to a Vd voltage (more greater than Vc), which is a dark state of an optically compensated birefringence (OCB) liquid crystal display. The optically compensated birefringence (OCB) liquid crystal display provides high response speed and wide viewing angle due to the regular arrangement of the liquid crystals cooperated with OCB special optical film.

The operating voltage of an optically compensated birefringence (OCB) liquid crystal display ranges from Vc (critical voltage) to Vd. A high voltage (usually, more than 20V) converts the splay state to the bend state, that is to say that the extra driving system needs to use in OCB. As shown in FIG. 3, correct retardation ($\Delta$ nd) and compensated film are very important in OCB panel.

SUMMARY

The invention provides an optically compensated birefringence liquid crystal alignment agent to polymerize a polymer having liquid crystal alignment memory on an alignment layer. Liquid crystals are rapidly converted from a splay state to a bend state along the polymer memory direction so that a liquid crystal display immediately reaches steady state at an initial voltage, without requiring application of a high voltage to be driven.

The optically compensated birefringence liquid crystal agent comprises a polymerizable monomer having formula (I) or (II):

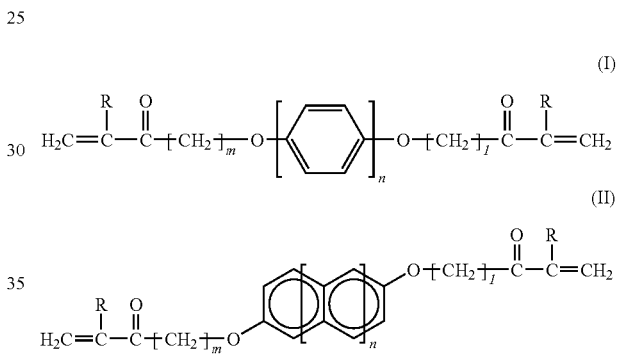

wherein R is the same or different and comprises H or methyl, n is 1-5, and m and 1 are 0-12. The invention also provides a liquid crystal display comprising a first substrate having a first surface and a second substrate having a second surface, an alignment layer formed on the first and second surfaces, respectively, a liquid crystal layer, and a polymer having liquid crystal alignment memory, wherein the first and second substrates are parallel and the first surface is opposite to the second surface. The method for fabricating the polymer having liquid crystal alignment memory and the liquid crystal layer is provided, comprising the following steps. A liquid crystal composition comprising a liquid crystal compound and the disclosed optically compensated birefringence liquid crystal alignment agent is prepared. The liquid crystal composition is injected into a space between the first and second substrates. A first voltage is applied to convert the liquid crystal compound of the liquid crystal layer from a splay state to a bend state. After the liquid crystal compound reaches steady state, a second voltage is applied to leave the liquid crystal compound in the splay state or the bend state. An energy ray is then applied to polymerize the polymerizable monomer having formula (I) or (II) to form the polymer having liquid crystal alignment memory with continuous application of the second voltage. The invention provides a rapidly drivable optically compensated birefringence liquid crystal display.

The invention further provides a method for fabricating a liquid crystal display, comprising the following steps. A liquid crystal composition comprising a liquid crystal compound and the disclosed optically compensated birefringence liquid crystal alignment agent is prepared. Next, a first substrate having a first surface and a second substrate having a second substrate are provided, wherein the first and second substrates are parallel and the first surface is opposite to the second surface. Next, an alignment layer is formed on the first and second surfaces, respectively. The liquid crystal composition is then injected into a space between the first and second substrates. Next, a first voltage is applied to the electrodes of the first and second substrates to convert the liquid crystal compound from a splay state to a bend state. After the liquid crystal compound reaches steady state, a second voltage is applied to leave the liquid crystal compound in the splay state or the bend state. An energy ray is then applied to polymerize the polymerizable monomer having formula (I) or (II) to form polymer layers on both sides of substrates having liquid crystal alignment memory with continuous application of the second voltage.

A detailed description is given in the following embodiments with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention can be more fully understood by reading the subsequent detailed description and examples with references made to the accompanying drawings, wherein.

DETAILED DESCRIPTION

The invention provides a liquid crystal composition comprising an optically compensated birefringence liquid crystal alignment agent to form a pair of polymer layers by phase separation method, which nano-functional layers having liquid crystal alignment memory on an alignment layer to substantially reduce the warm-up time without extra driving circuit.

The invention provides a method for fabricating a liquid crystal display, comprising the following steps. A liquid crystal composition comprising a liquid crystal compound, such as an optically compensated birefringence (OCB) liquid crystal compound, and an optically compensated birefringence liquid crystal alignment agent is prepared. Preferably, the liquid crystal compound has a positive dielectric constant difference. The optically compensated birefringence liquid crystal alignment agent comprises a polymerizable monomer having formula (I) or (II).

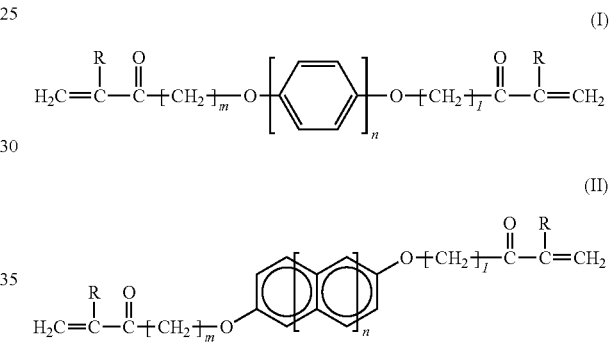

In formula (I) or (II), R is the same or different and may comprise H or methyl, n may be 1-5, and m and l may be 0-12, preferably 1-11. The polymerizable monomer having formula (I) or (II) has a weight percentage of about 0.01-30 wt %, preferably 0.1-5 wt %, in the liquid crystal composition. Specifically, the polymerizable monomer having formula (I) or (II) can be polymerized by applying ray or energy, without addition of any initiator. Residual image or response delay resulting from remaining initiators can thus be avoided. Nevertheless, low quantities of initiators, such as light initiators or heat initiators, less than 0.05 wt % can be used to increase the rate of polymerization. The polymerizable monomers having formula (I) or (II) provided by the invention are shown in Table 1. Specifically, 80% purity or more of the polymerizable monomer having formula (I) or (II) is required to avoid non-uniform optical performance deteriorating image quality.

TABLE 1

| Number | Polymerizable monomer structure |
| --- | --- |
| 1 | 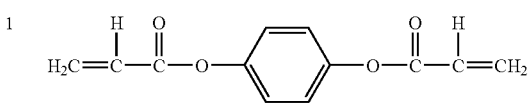 |

TABLE 1-continued

| Number | Polymerizable monomer structure |
|---|---|
| 2 | [structure: methacrylate-phenyl-O-(CH₂)₂-acrylate] |
| 3 | [structure: methacrylate-(CH₂)₄-O-[phenyl]₂-O-(CH₂)₃-methacrylate] |
| 4 | [structure: acrylate-(CH₂)₃-O-[phenyl]₄-O-(CH₂)₃-acrylate] |
| 5 | [structure: acrylate-(CH₂)₇-O-phenyl-O-(CH₂)₆-acrylate] |
| 6 | [structure: acrylate-CH₂-O-naphthyl-O-acrylate] |
| 7 | [structure: methacrylate-(CH₂)₃-O-anthracenyl-O-(CH₂)₃-methacrylate] |
| 8 | [structure: acrylate-(CH₂)₁₀-O-naphthyl-O-(CH₂)₁₀-acrylate] |
| 9 | [structure: acrylate-CH₂-O-phenyl-O-CH₂-acrylate] |

Figure 1:
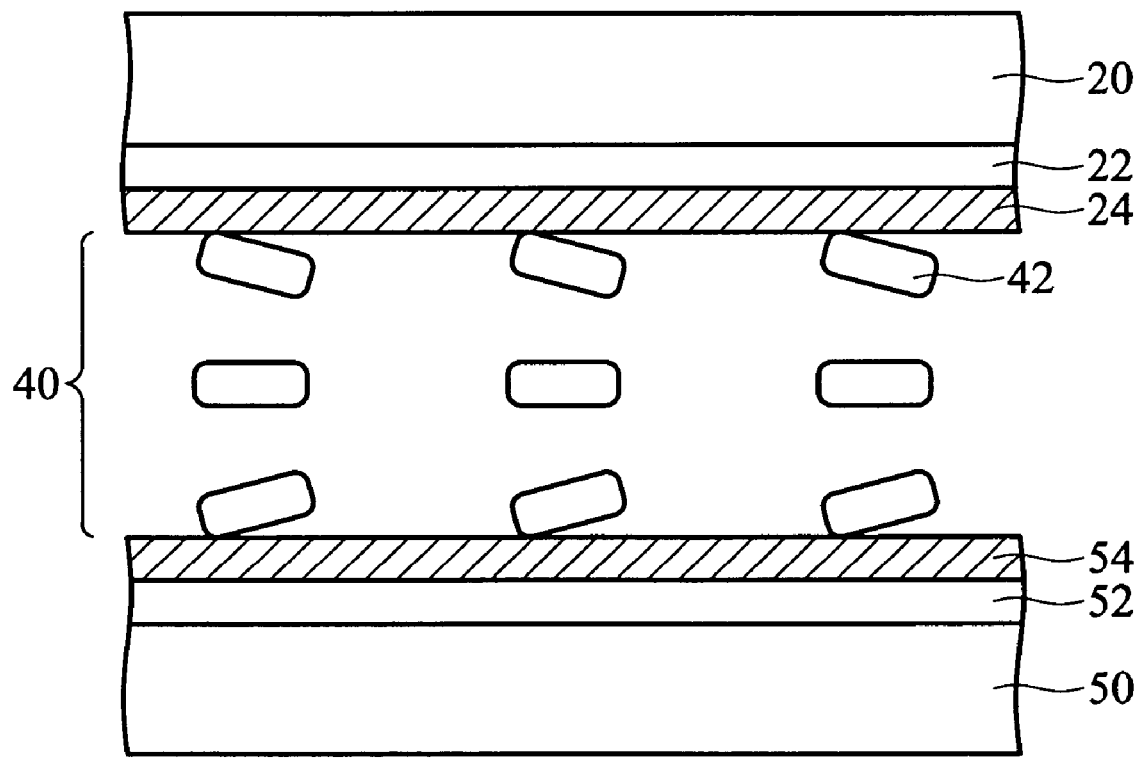
FIG. 1 is a cross section of a related optically compensated birefringence liquid crystal display.
Figure 2C:
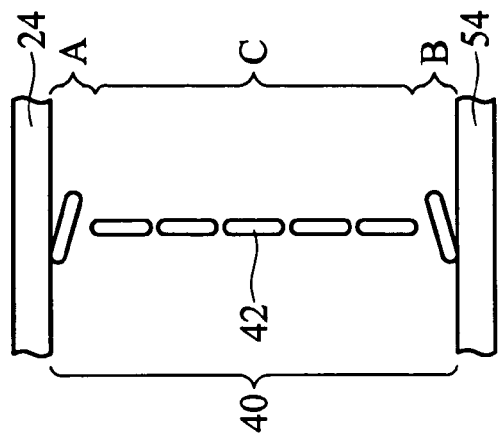
FIGS. 2a-2c show liquid crystal arrangements of optically compensated birefringence liquid crystal display under various applied voltages.
Figure 2B:
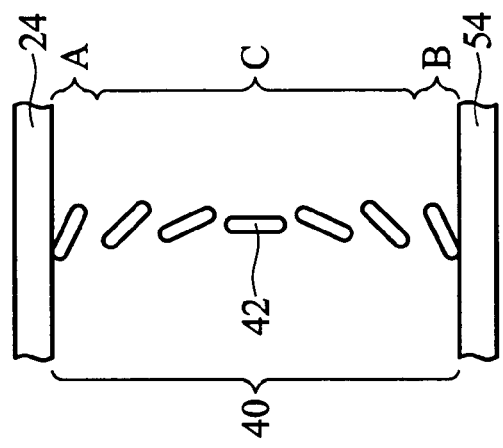
Figure 2A:
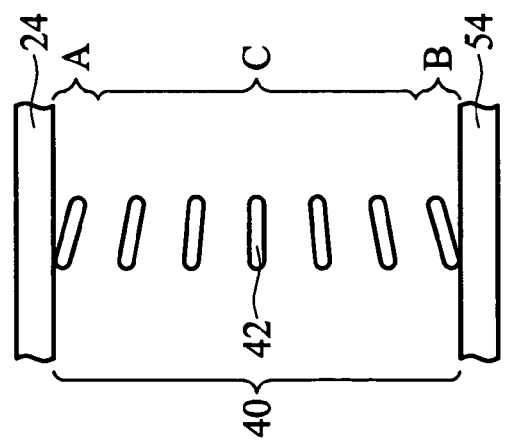
Figure 3:
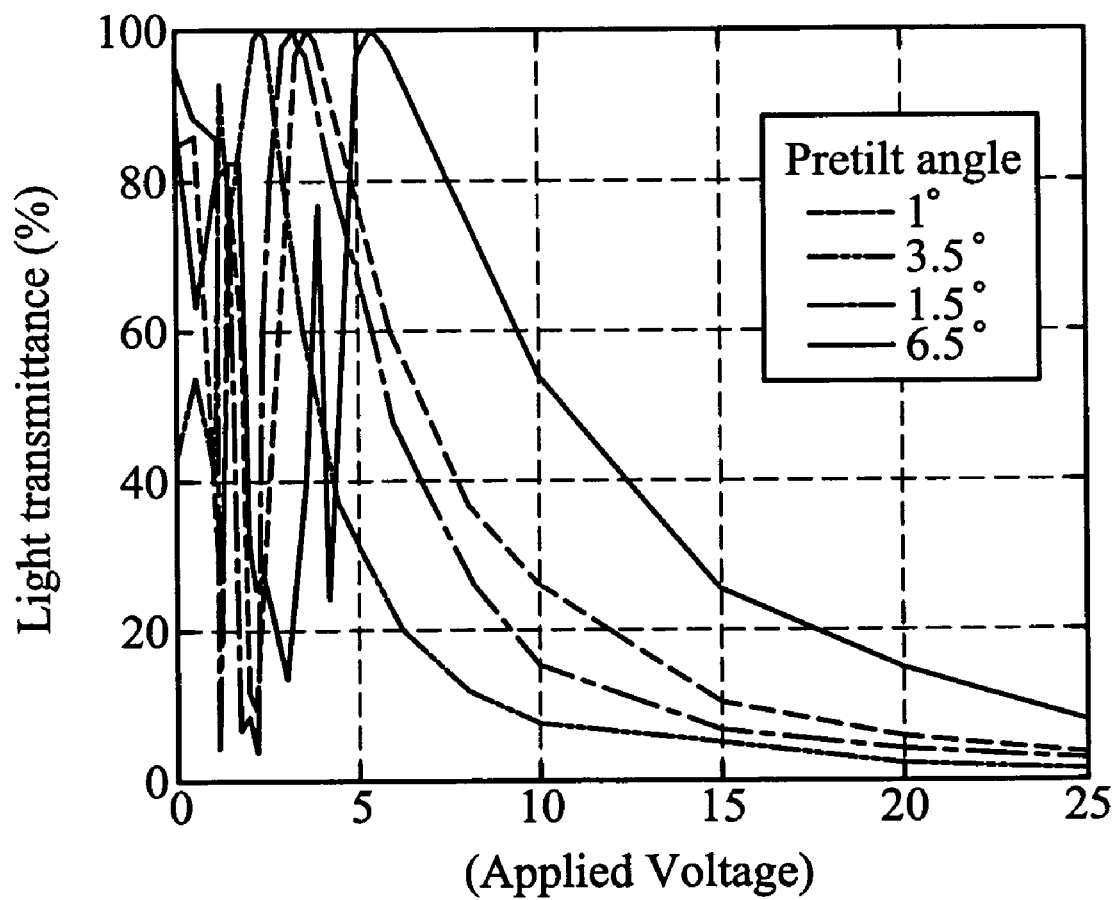
FIG. 3 shows a relationship between applied voltage and light transmittance of conventional optically compensated birefringence liquid crystal displays having various pretilt angles.
Figure 4A:
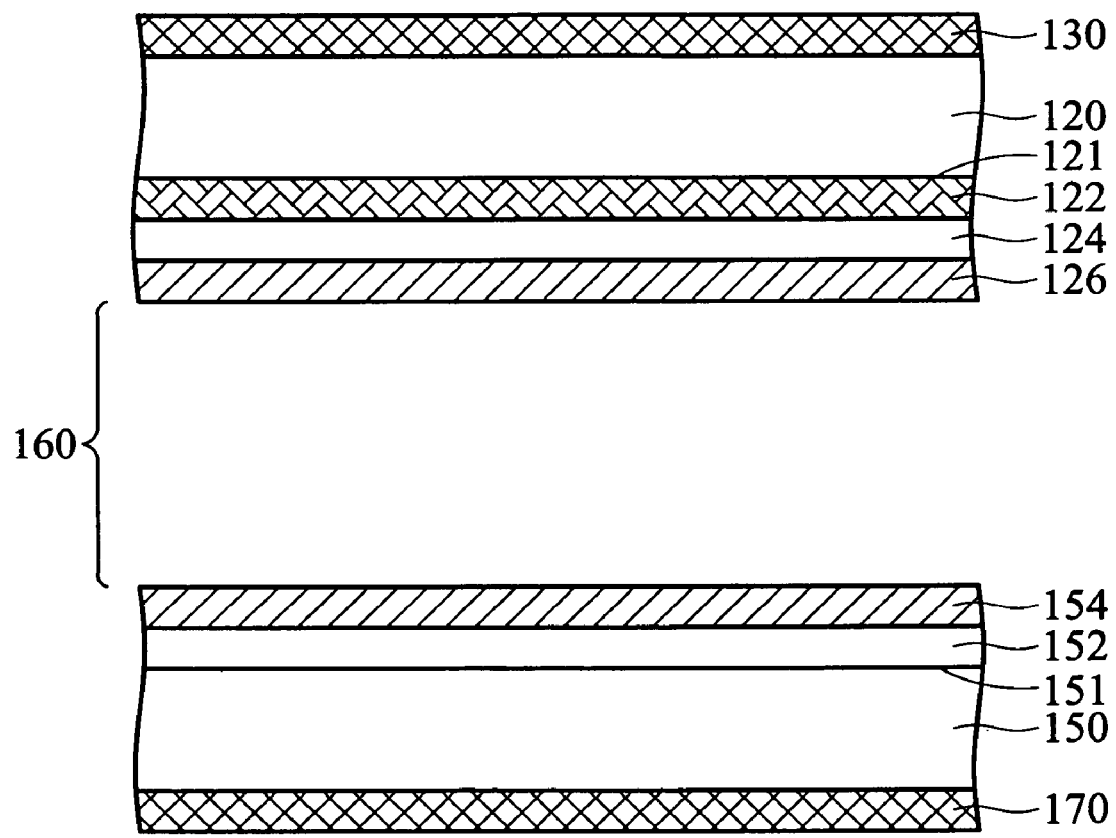
FIGS. 4a-4c are cross sections of an optically compensated birefringence liquid crystal display of the invention.

Next, referring to FIG. 4a, a first substrate 120 having a first surface 121 and a second substrate 150 having a second surface 151 are provided. The first substrate 120 and the second substrate 150 are parallel and the first surface 121 is opposite to the second surface 151. The first substrate 120 and the second substrate 150 are separated by a plurality of spherical particles or spacers (nor shown) to form a space 160. Next, a color filter 122, a first electrode 124, and a first alignment layer 126 are formed on the first surface 121, and a second electrode 152 and a second alignment layer 154 are formed on the second surface 151 in order. The alignment layers (126 and 154) may comprise polyimide. Furthermore, a first polarizer 130 is installed outside the first substrate 120 and a second polarizer 170 is installed outside the second substrate 150. Specifically, the first and second alignment layers (126 and 154) are rubbed after being formed and their alignment directions are approximately the same.

Figure 4B:
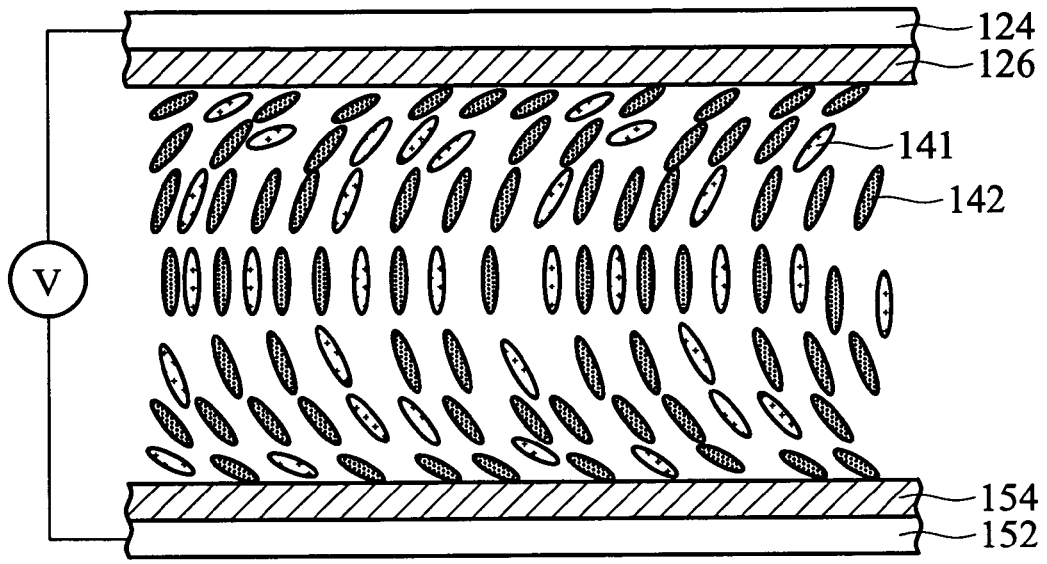
Figure 5A:
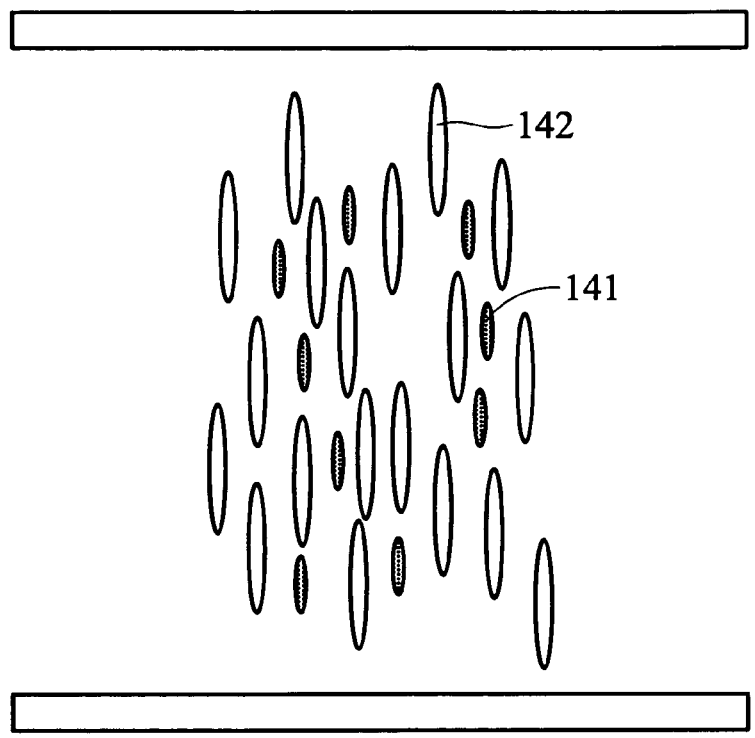
FIGS. 5a-5b show shift directions of polymerizable monomers and liquid crystals are the same in the invention, without being influenced by electric field, if no UV irradiation.
Figure 5B:
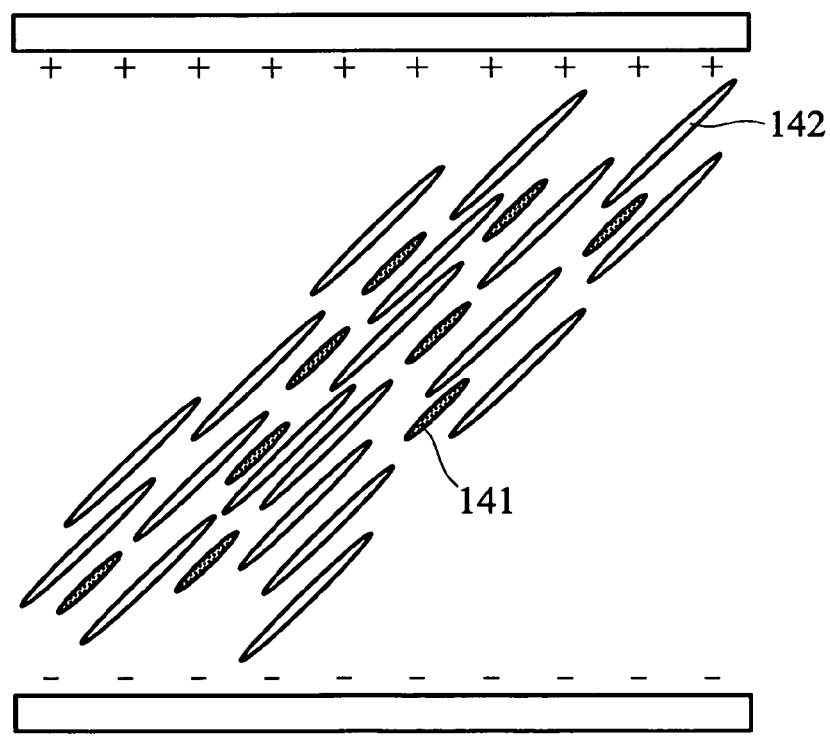
Figure 6A:
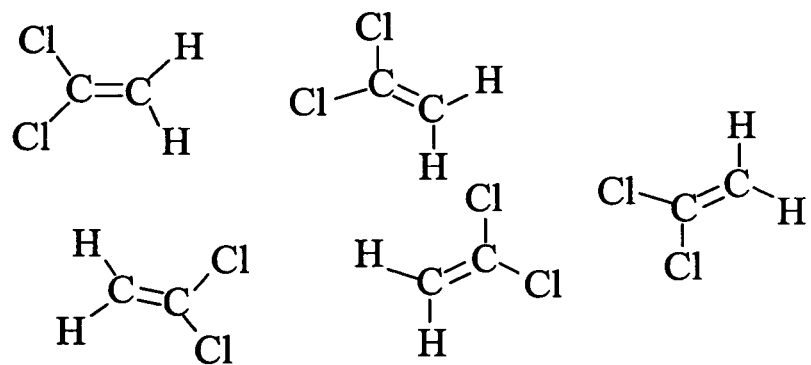
FIGS. 6a-6b show shift directions of polar monomers are influenced by electric field.
Figure 6B:
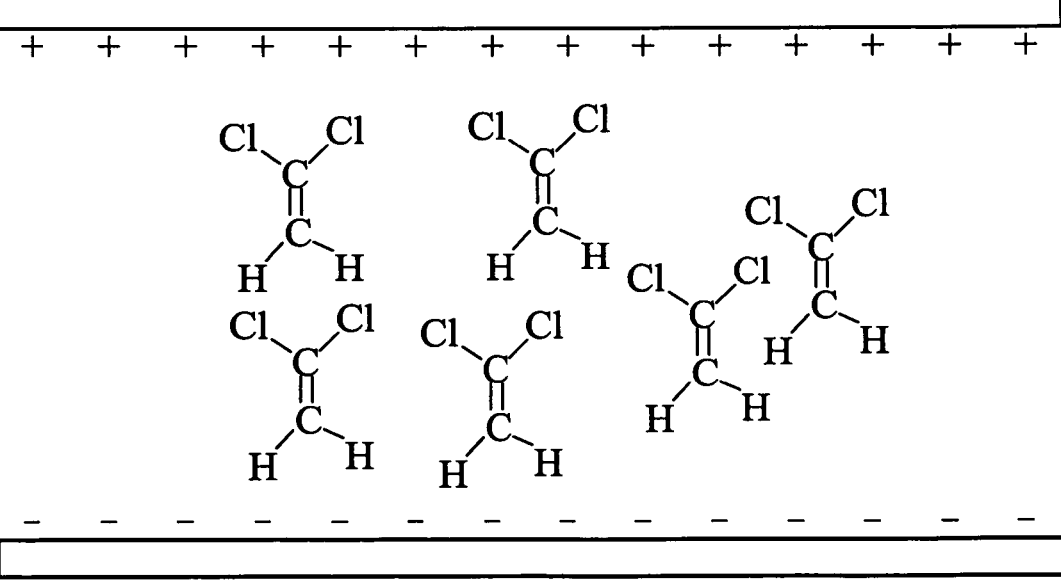

Next, the liquid crystal composition is injected into the space 160 between the first substrate 120 and the second substrate 150 by a capillarity fill process or a one-drop fill (ODF) process. A first voltage of about 0-40V is then applied to produce a potential difference between the first and second electrodes to convert the liquid crystal compound from a splay state to a bend state. When the potential difference is formed, a capacitor comprising the first electrode 124, the second electrode 152, and the liquid crystal compound is formed, simultaneously. A second voltage of about 0-10V is applied to leave the liquid crystal compound in the splay state or the bend state, preferably the bend state, after reaching steady state, as shown in FIG. 4b. The polymerizable monomer 141 having formula (I) or (II) is also shifted to the bend state as the liquid crystal compound shifts, without being influenced by electric field, symmetrical molecules, as shown in FIGS. 5a and 5b. On the contrary, the asymmetric molecules under electric field easily become a shift direction different from the liquid crystal compound in electric field, as shown in FIGS. 6a and 6b. Various electrical performances among a pure liquid crystal compound, a polar-doped liquid crystal compound, and a non-polar-doped liquid crystal compound are compared in Table 2.

TABLE 2

|  | Doping amount (%) | Leakage current (pA) | Specific resistance (ρ) |
|---|---|---|---|
| Pure liquid crystal compound | — | 2.4 | 1.10E+14 |
| Asymmetric molecule | 5% | 440 | 6.90E+11 |
| Symmetrical molecules | 5% | 2 | 1.67E+14 |

The results indicate that the asymmetric liquid crystal mixtures have 100 times the leakage current of the symmetric liquid crystal mixtures.

Figure 4C:
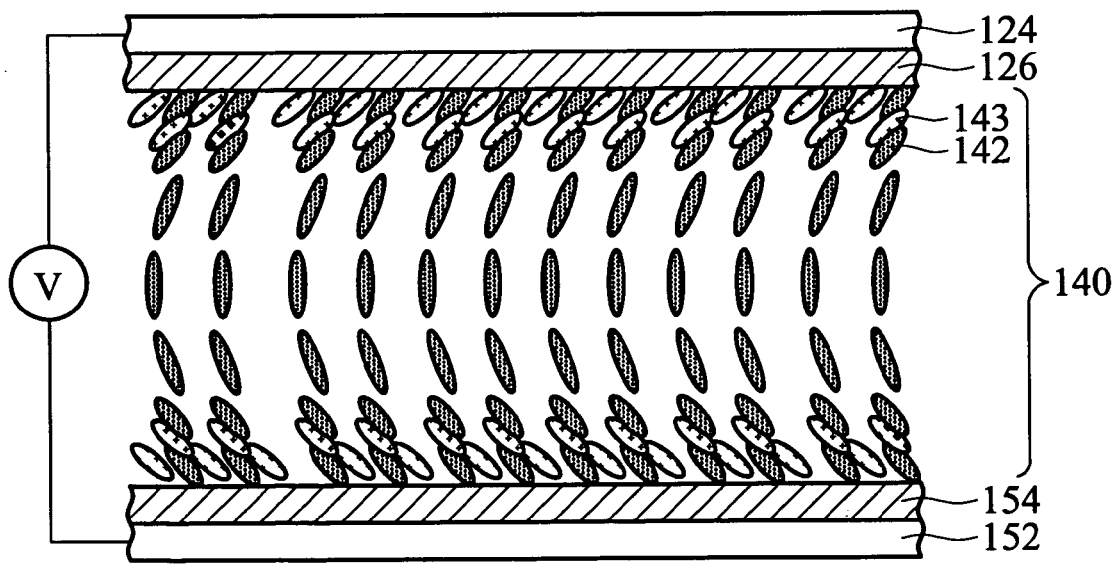
Figure 7:
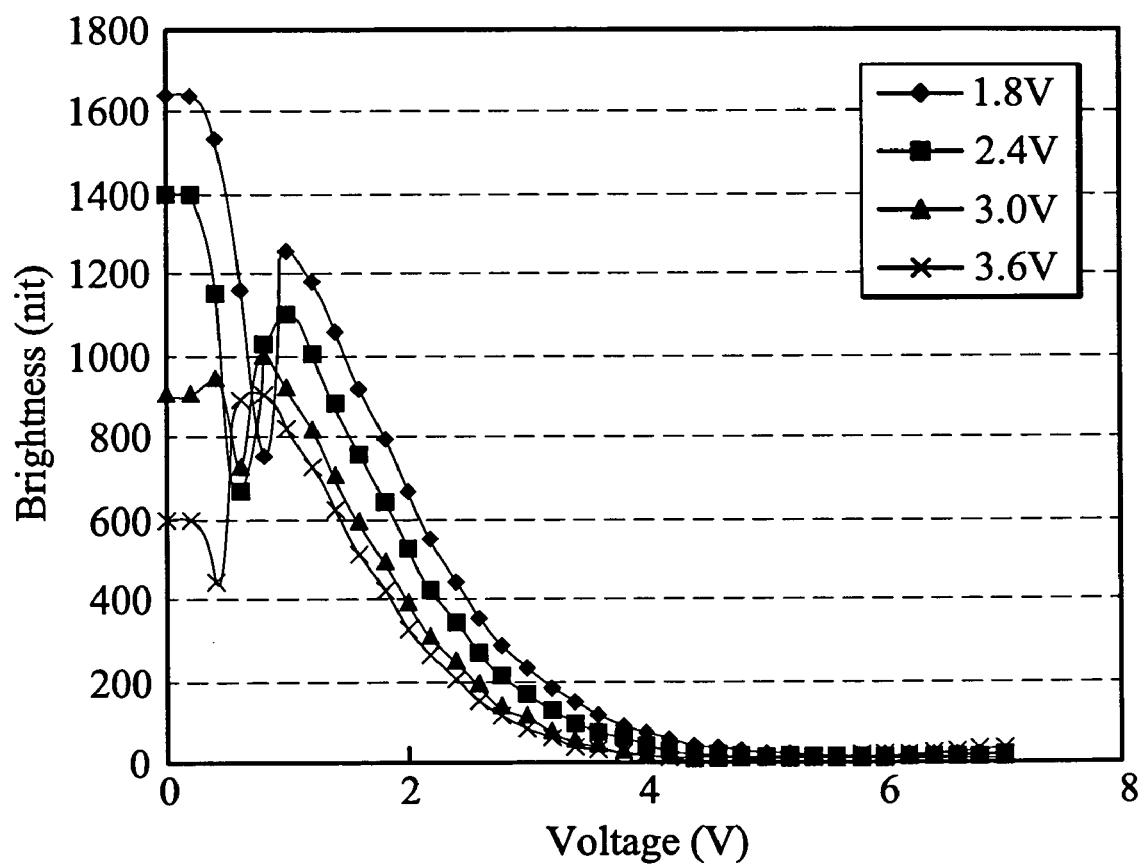
FIG. 7 shows a relationship between voltage and brightness of the invention fabricated under various voltage applications.

Next, referring to FIG. 4c, after a second voltage is applied to leave the liquid crystal compound in the splay state or the bend state, an energy ray, preferably ultraviolet, is applied to polymerize the shifted polymerizable monomer to form a polymer 143 with continuous application of the second voltage. The shifted polymerizable monomer is polymerized on the alignment layer so that the formed polymer 143 remains in the original shift direction of the monomer, having liquid crystal alignment memory. The alignment layer having the polymer formed thereon has a pretilt angle of about 1-25°. Clearly, the polymer 143 is formed on the alignment layers (126 and 154) on both sides of a liquid crystal layer 140 comprising the liquid crystal compound 142, that is, formation of a functional nano-surface structure, not a network structure in all cell. Referring to FIG. 7, a relationship between voltage and brightness of optically compensated birefringence liquid crystal displays fabricated under various second voltage applications is illustrated. The results indicate that the applied second voltage affects electrical performance of liquid crystal displays.

To remove the remaining polymerizable monomer 141, a thermal process or a visible light irradiation is performed to consume the polymerizable monomer 141 completely. The thermal process is performed at a temperature of about 50-250° C.

The fabrication method of the invention is also suitable for fabricating color filter on array (COA), transflective, twisted nematic (TN), multi-domain vertical alignment (MVA), or patterned multi-domain vertical alignment (PMVA) liquid crystal displays.

Figure 8:
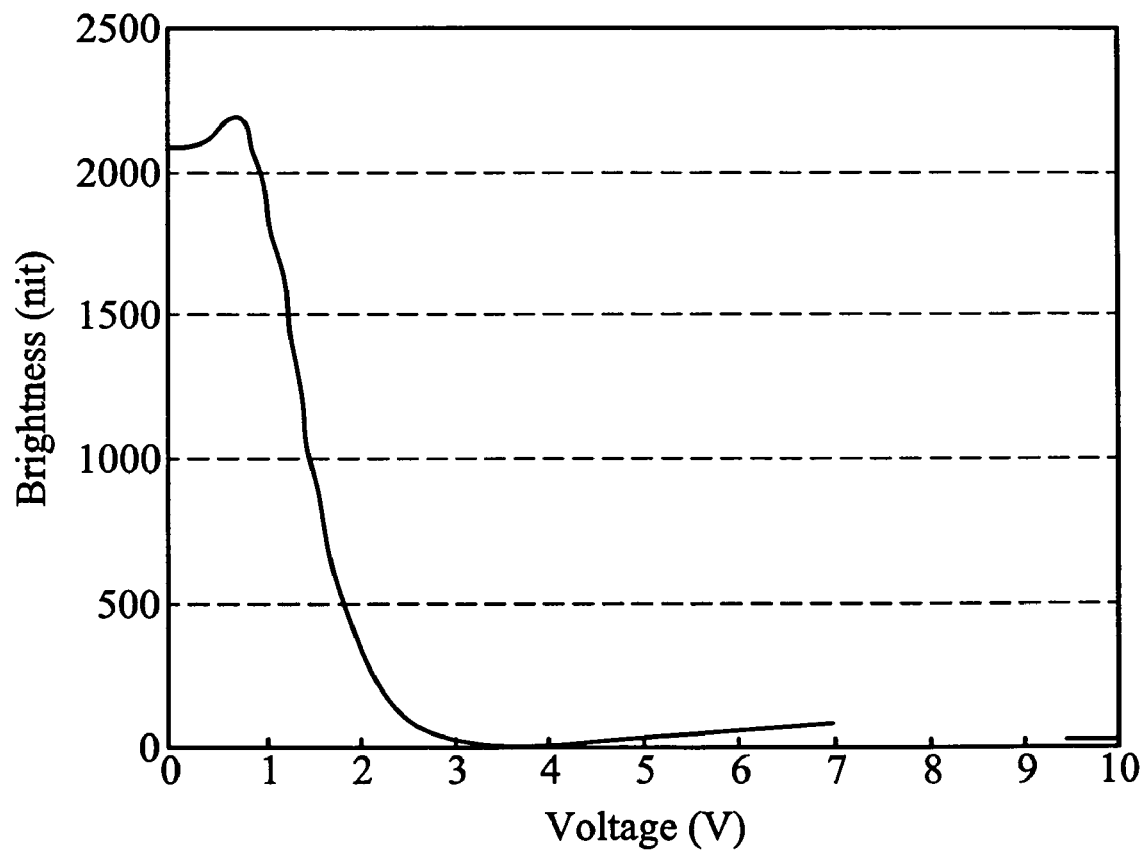
FIG. 8 shows one case of a relationship between voltage and brightness of a liquid crystal display of the invention.

Referring to FIG. 8, a relationship between applied voltage and brightness of a preferable liquid crystal display of the invention is illustrated. The doping amount of the polymerizable monomer having formula (I) or (II) is 3.5 wt %. The liquid crystal approaches the bend state at a lower initial voltage, avoiding a non-continuous arrangement from the splay state to the bend state.

Compared to related art optically compensated birefringence liquid crystal displays, the invention provides a liquid crystal display having faster response time.

EXAMPLES

Comparative Example 1

The response time of various liquid crystal displays was measured. The liquid crystal layers thereof comprise non-doped optically compensated bend liquid crystal compound A (OCB LC-A, manufactured and sold by Merck, Δ n=0.171, Δ ε=11.4, γ=166.0 mPa·s), non-doped optically compensated bend liquid crystal compound B (OCB LC-B, manufactured and sold by Chisso, Δ n=0.169, Δ ε=10.1, γ=213.0 mPa·s), and non-doped optically compensated bend liquid crystal compound C (OCB LC-C, manufactured and sold by DIC, Δ n=0.180, Δ ε=12.5, γ=157.0 mPa·s), respectively. Each of the polyimide alignment layers thereof has various rubbing depth of 0.4, 0.6, and 0.8 mm. The voltages of 2.5V, 6.5V, and 2.5V are applied in order. The measurement results are shown in Table 3.

TABLE 3

| | Rubbing depth | | | | | |
|---|---|---|---|---|---|---|
| | 0.4 mm | | 0.6 mm | | 0.8 mm | |
| Liquid | | | Response time | | | |
| crystal | Tr/Tf | Sum | Tr/Tf | Sum | Tr/Tf | Sum |
| OCB LC-A | 0.39/2.35 | 2.74 | 0.39/2.35 | 2.74 | 0.39/2.75 | 3.14 |
| | 0.59/2.35 | 2.94 | 0.59/2.35 | 2.94 | 0.39/2.75 | 3.14 |
| | 0.59/2.35 | 2.94 | 0.39/2.35 | 2.74 | 0.59/2.75 | 3.34 |
| | Average | 2.87 | Average | 2.81 | Average | 3.21 |
| OCB LC-B | 0.59/2.75 | 3.34 | | | 0.59/2.94 | 3.53 |
| | 0.59/2.94 | 3.53 | | | 0.59/2.95 | 3.54 |
| | 0.59/2.95 | 3.54 | | | 0.59/2.96 | 3.55 |
| | Average | 3.47 | | | Average | 3.54 |
| OCB LC-C | 0.39/2.75 | 3.14 | 0.39/2.35 | 2.74 | 0.59/2.16 | 2.75 |
| | 0.39/2.76 | 3.14 | 0.39/2.35 | 2.75 | 0.59/2.16 | 2.75 |
| | 0.39/2.77 | 3.14 | 0.39/2.35 | 2.74 | 0.39/2.35 | 2.74 |
| | Average | 3.14 | Average | 2.74 | Average | 2.75 |

Example 1

2.0 wt % polymerizable monomer 9 disclosed in Table 1 was doped into the optically compensated bend liquid crystal compound (manufactured and sold by Chisso, Δ n=0.142, Δ ε=10.5, γ=35.7 mPa·s). The liquid crystal compound is then injected into a liquid crystal display. Next, a voltage is applied to convert the liquid crystal compound from a splay state to a bend state. The polymerizable monomer is polymerized by ultraviolet irradiation under 5V. The response time thereof is measured in the same way as comparative example 1, as recited in Table 4.

Figure 9:
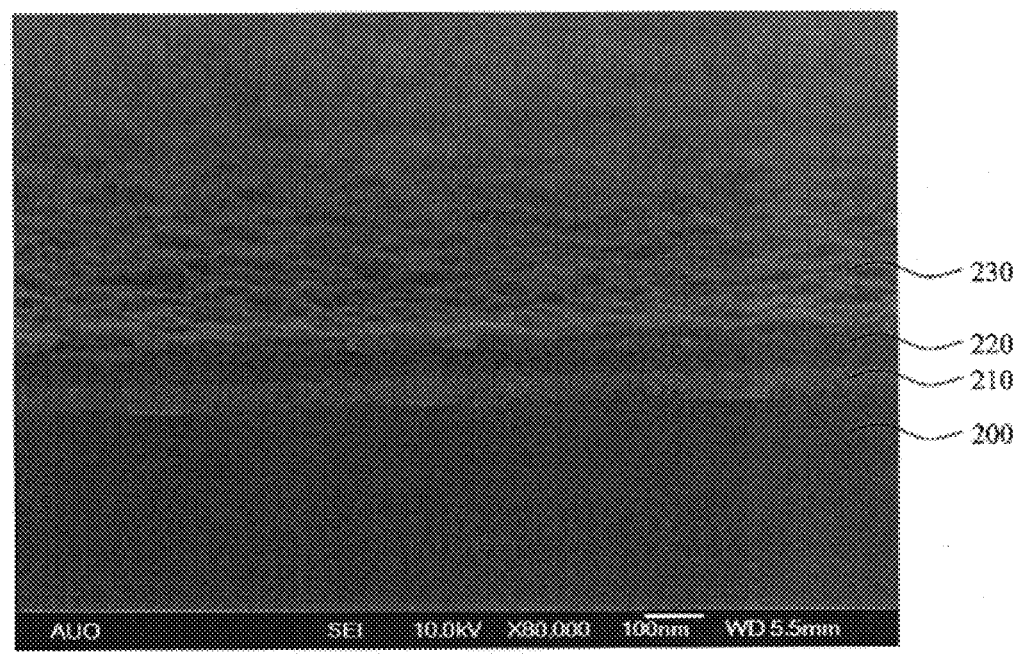
FIG. 9 shows a scanning electron microscope spectrogram of the lower substrate of the optically compensated birefringence liquid crystal display in example 1 of the invention.

Referring to FIG. 9, a scanning electron microscope spectrogram of the lower substrate of the optically compensated birefringence liquid crystal display disclosed in example 1 is shown. A lower electrode 210, an alignment layer 220, and a polymer 230 having liquid crystal alignment memory are formed on the lower substrate 200 in order. The polymer 230 heightens a pretilt angle and reduces surface free energy of the alignment layer, to rapidly convert the liquid crystal compound from splay state to bend state.

Example 2

2.05 wt % polymerizable monomer 9 disclosed in Table 1 was doped into the optically compensated bend liquid crystal compound (manufactured and sold by Chisso, $\Delta$ n=0.142, $\Delta$ $\epsilon$=10.5, $\gamma$=135.7 mPa·s). The liquid crystal compound is then injected into a liquid crystal display. Next, a voltage is applied to convert the liquid crystal compound from splay state to bend state. The polymerizable monomer is polymerized by ultraviolet irradiation under 5V. The response time thereof is measured in the same way as comparative example 1, as recited in Table 4.

TABLE 4

|  | Example 1 |  | Example 2 |  |
|---|---|---|---|---|
| Doping amount | 2 wt % |  | 2.5 wt % |  |
| Polymerizing voltage | 5 V |  | 2.5 V |  |
| Response time | 0.39/1.96 | 2.35 | 0.39/2.75 | 3.14 |
|  | 0.39/1.76 | 2.15 | 0.39/2.76 | 3.14 |
|  | 0.39/1.77 | 2.16 | 0.39/2.35 | 2.74 |
|  | Average | 2.22 | Average | 3.01 |

Figure 10:
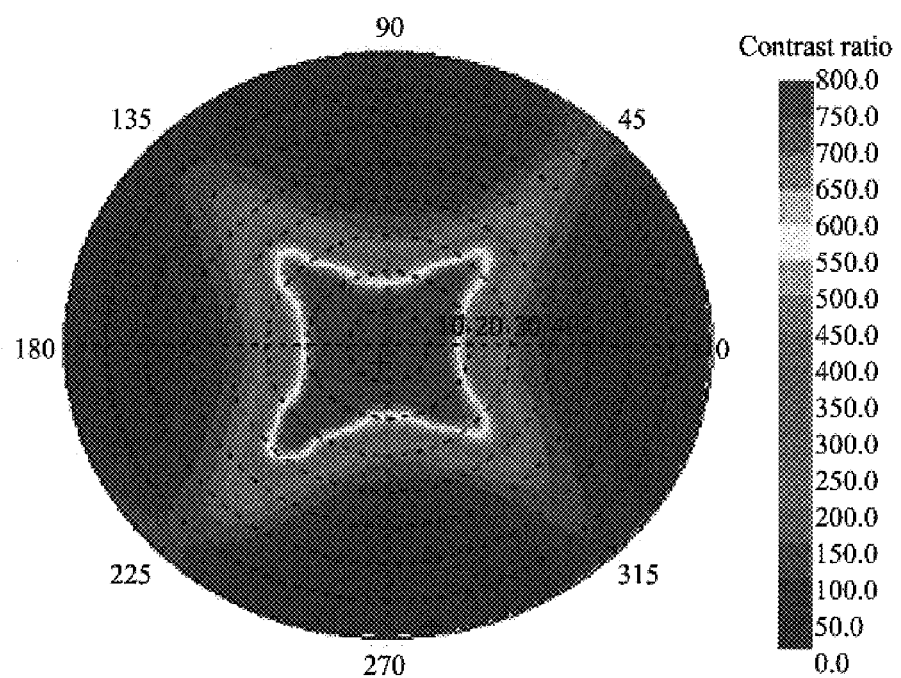
FIG. 10 shows a view angle diagram of an optically compensated birefringence liquid crystal display of the invention.

Referring to FIG. 10, a viewing angle diagram of an optically compensated birefringence liquid crystal display of the invention is shown. The maximum contrast ratio (CR) thereof is about 810 and its full viewing angle contrast ratio is almost greater than 10.

The invention provides a liquid crystal composition comprising an optically compensated birefringence liquid crystal alignment agent to form a polymer having liquid crystal alignment memory on an alignment layer to substantially reduce consumption time and applied voltage requirements for converting a splay state to a bend state in an optically compensated birefringence liquid crystal display in the initial operation and acquire faster response time, as shown in Tables 3 and 4.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optically compensated birefringence liquid crystal alignment agent comprising a polymerizable monomer having formula (I) or (II):

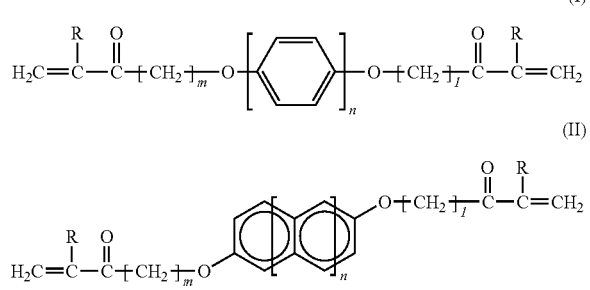

wherein R is the same or different and comprises H or methyl, n is 1-5, and m and l are 0-12.

2. A method for fabricating a liquid crystal display, comprising:

preparing a liquid crystal composition comprising a liquid crystal compound and an optically compensated birefringence liquid crystal alignment agent comprising a polymerizable monomer having formula (I) or (II):

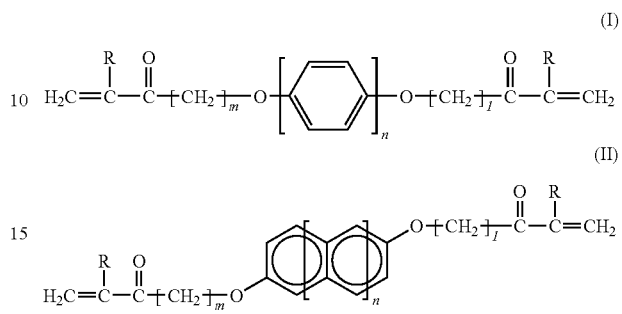

wherein R is the same or different and comprises H or methyl, n is 1-5, and m and l are 0-12; providing a first substrate and a second substrate, wherein the first and second substrates are parallel and a first surface of the first substrate is opposite to a second surface of the second substrate;

forming an alignment layer on the first and second surfaces;

injecting the liquid crystal composition into a space between the first and second substrates;

applying a first voltage to convert the liquid crystal compound from a splay state to a bend state;

applying a second voltage to leave the liquid crystal compound in the splay state or the bend state after reaching steady state; and applying an energy ray to polymerize the polymerizable monomer having formula (I) or (II) to produce liquid crystal alignment memory with continuous application of the second voltage.

3. The method for fabricating a liquid crystal display as claimed in claim 2, wherein the polymerizable monomer having formula (I) or (II) has a weight percentage of about 0.01 wt % to about 30 wt % in the liquid crystal composition.

4. The method for fabricating a liquid crystal display as claimed in claim 2, wherein the liquid crystal compound is an optically compensated birefringence (OCB) liquid crystal compound.

5. The method for fabricating a liquid crystal display as claimed in claim 2, wherein the alignment layer comprises polyimide.

6. The method for fabricating a liquid crystal display as claimed in claim 2, further comprising rubbing the alignment layer after the alignment layer is formed.

7. The method for fabricating a liquid crystal display as claimed in claim 2, wherein the liquid crystal composition is injected into the space between the first and second substrates by a one-drop fill process or a vacuum capillarity fill process.

8. The method for fabricating a liquid crystal display as claimed in claim 2, wherein a potential difference is formed between a first electrode of the first substrate and a second electrode of the second substrate by applying the first voltage and a capacitor comprising the first electrode, the second electrode, and the liquid crystal compound is formed.

9. The method for fabricating a liquid crystal display as claimed in claim 2, wherein the first voltage is about 0-40V.

10. The method for fabricating a liquid crystal display as claimed in claim 2, wherein the second voltage is about 0-10V.

11. The method for fabricating a liquid crystal display as claimed in claim 2, wherein the polymerizable monomer having formula (I) or (II) is polymerized by irradiating ultraviolet.

12. The method for fabricating a liquid crystal display as claimed in claim 2, further comprising consuming completely the polymerizable monomer having formula (I) or (II) by a thermal process after polymerizing the polymerizable monomer having formula (I) or (II) by applying the energy ray.

13. The method for fabricating a liquid crystal display as claimed in claim 12, wherein the thermal process is performed at a temperature of about 50-250° C.

14. The method for fabricating a liquid crystal display as claimed in claim 2, further comprising consuming completely the polymerizable monomer having formula (I) or (II) by irradiating visible light after polymerizing the polymerizable monomer having formula (I) or (II) by applying the energy ray.

15. The method for fabricating a liquid crystal display as claimed in claim 2, a polymer is formed on the alignment layer to create a pretilt angle of about 1-25° thereof during applying the energy to polymerize the polymerizable monomer having formula (I) or (II).

16. The method for fabricating a liquid crystal display as claimed in claim 2, wherein a polymer polymerized by the polymerizable monomer having formula (I) or (II) is formed on the alignment layer on both sides of a liquid crystal layer comprising the liquid crystal compound.

17. The method for fabricating a liquid crystal display as claimed in claim 16, wherein the polymer formed on the first and second surfaces is separated by the liquid crystal layer.

18. A liquid crystal display, comprising:
a first substrate having a first surface;
a second substrate having a second surface, wherein the first and second substrates are parallel and the first surface is opposite to the second surface;
an alignment layer formed on the first and second surfaces, respectively;
a polymer having liquid crystal alignment memory formed on the alignment layer;
a liquid crystal layer interposed between the first and second substrates, wherein the steps of forming the polymer having liquid crystal alignment memory and the liquid crystal layer comprise:
preparing a liquid crystal composition comprising a liquid crystal compound and an optically compensated birefringence liquid crystal alignment agent comprising a polymerizable monomer having formula (I) or (II):

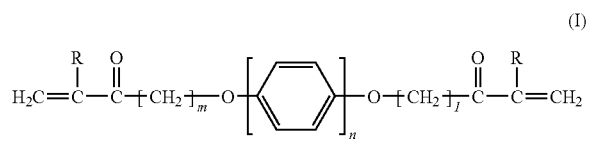

(I)

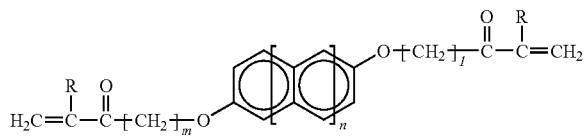

(II)

wherein R is the same or different and comprises H or methyl, n is 1-5, and m and l are 0-12;
injecting the liquid crystal composition into a space between the first and second substrates;
applying a first voltage to convert the liquid crystal compound of the liquid crystal layer from a splay state to a bend state;
applying a second voltage to leave the liquid crystal compound in the splay state or the bend state after reaching steady state; and
applying an energy ray to polymerize the polymerizable monomer having formula (I) or (II) to form the polymer having liquid crystal alignment memory with continuous application of the second voltage.

19. The liquid crystal display as claimed in claim 18, wherein the polymerizable monomer having formula (I) or (II) has a weight percentage of about 0.01-30 wt % in the liquid crystal composition.

20. The liquid crystal display as claimed in claim 18, wherein the liquid crystal compound is an optically compensated birefringence (OCB) liquid crystal compound.

21. The liquid crystal display as claimed in claim 18, wherein the alignment layer comprises polyimide.

22. The liquid crystal display as claimed in claim 18, wherein the alignment layer is rubbed after being formed.

23. The liquid crystal display as claimed in claim 18, wherein the liquid crystal composition is injected into the space between the first and second substrates by a one-drop fill process.

24. The liquid crystal display as claimed in claim 18, wherein a potential difference is formed between a first electrode of the first substrate and a second electrode of the second substrate by applying the first voltage and a capacitor comprising the first electrode, the second electrode, and the liquid crystal compound is formed.

25. The liquid crystal display as claimed in claim 18, wherein the first voltage is about 0-40V.

26. The liquid crystal display as claimed in claim 18, wherein the second voltage is about 0-10V.

27. The liquid crystal display as claimed in claim 18, wherein the polymerizable monomer having formula (I) or (II) is polymerized by irradiating ultraviolet.

28. The liquid crystal display as claimed in claim 18, the alignment layer having the polymer formed thereon has a pretilt angle of about 1-25°.

29. The liquid crystal display as claimed in claim 18, wherein the polymer formed on the first and second surfaces is separated by the liquid crystal layer.

30. The liquid crystal display as claimed in claim 18, wherein the liquid crystal display comprises color filter on array (COA), transflective, twisted nematic (TN), multi-domain vertical alignment (MVA), or patterned multi-domain vertical alignment (PMVA) liquid crystal display.

* * * * *